United States Patent [19]
Joyce et al.

[11] Patent Number: 5,850,429
[45] Date of Patent: Dec. 15, 1998

[54] METHOD AND SYSTEM FOR REMOTELY CONTROLLING AN INTERACTIVE VOICE RESPONSE SYSTEM

[75] Inventors: Michael J. Joyce, Blackburn South, Australia; Ping-Wen Ong, Middletown, N.J.; Abbas Ourmazd, Berlin, Germany; Colin A. Warwick, Holmdel, N.J.

[73] Assignee: Lucent Technologies Inc., Murray Hill, N.J.

[21] Appl. No.: 762,019

[22] Filed: Dec. 11, 1996

[51] Int. Cl.$^6$ ..................................................... H04M 3/42
[52] U.S. Cl. ........................ 379/88; 379/88.24; 379/93.17
[58] Field of Search ................... 379/67, 88, 89, 379/93.17, 93.18, 93.19, 93.23, 93.25

[56] References Cited

U.S. PATENT DOCUMENTS

| | | | |
|---|---|---|---|
| 4,625,080 | 11/1986 | Scott | 379/77 |
| 4,776,002 | 10/1988 | Kammerl | 379/88 |
| 4,897,865 | 1/1990 | Canuel | 379/144 |
| 4,899,369 | 2/1990 | Kondziela | 379/67 |
| 4,975,948 | 12/1990 | Andresen et al. | 379/355 |
| 5,034,975 | 7/1991 | Grimes | 379/67 |
| 5,278,894 | 1/1994 | Shaw | 379/67 |
| 5,412,660 | 5/1995 | Chen et al. | 370/110.1 |
| 5,450,488 | 9/1995 | Pugaczewski et al. | 379/67 |
| 5,502,763 | 3/1996 | Brendzel | 379/211 |
| 5,537,618 | 7/1996 | Boulton et al. | 395/161 |
| 5,544,235 | 8/1996 | Ardon | 379/177 |
| 5,550,746 | 8/1996 | Jacobs | 395/54 |
| 5,550,915 | 8/1996 | Partridge, III | 379/355 |
| 5,592,538 | 1/1997 | Kosowsky et al. | 379/88 |
| 5,596,636 | 1/1997 | Davies et al. | 379/216 |
| 5,651,109 | 7/1997 | Glasser et al. | 395/522 |
| 5,668,928 | 9/1997 | Groner | 704/243 |

*Primary Examiner*—Daniel S. Hunter

[57] ABSTRACT

A method and system for remotely controlling an interactive voice response (IVR) system. At least one command for controlling the IVR system is displayed using a graphical user interface based on locally stored information relating to a command menu for the IVR. When a command is selected from the display, a command sequence, that includes at least one DTMF tone, is generated that is related to each selected command. The command sequence also includes at least one DTMF tone that controls the IVR system to return to a higher level within the command menu when the command menu is hierarchical.

23 Claims, 6 Drawing Sheets

METHOD AND SYSTEM FOR REMOTELY CONTROLLING AN INTERACTIVE VOICE RESPONSE SYSTEM

FIELD OF THE INVENTION

The present invention relates to the field of telecommunications. More particularly, the present invention relates to a method and a system for controlling an interactive voice response (IVR) system.

BACKGROUND OF THE INVENTION

A conventional telecommunication service having a conventional interactive voice response (IVR) system requires that a user dial a predetermined telephone number, such as an "800" number, to access the telecommunication service. Once the service is accessed, the IVR system generates an audible message that lists commands and/or system functions in a menu-type format that can be either hierarchical or non-hierarchical. The user selects a particular command or function by dialing the number corresponding to the desired command or function.

For example, when a user calls an electronic voice messaging system, such as the Audix system, an IVR system audibly generates a main menu list, such as, "To record a message, dial 1; to listen to a message, dial 2; to record a greeting, dial 3; and to change your password, dial 5." FIG. 1 shows a graphical representation of a portion of an exemplary interactive hierarchical voice response system command menu. After the IVR system generates the main menu list, one of the menu selections, represented by boxed numbers at the left of FIG. 1, is selected and entered by a user. For this example, the user selects and enters the number 2 and the IVR system audibly generates a menu list for the next level of the command menu, such as "To listen to a message, dial 0; to respond or forward a message, dial 1; to skip to the next message, dial #; and to delete a message, dial *D." For the present example, the user keys in 0 to listen to a message. At some point during the message, the user keys in 1 to respond or forward a message. The IVR system then audibly generates the next level of the command menu, such as, "To reply by voice-mail, dial 7; to call the sender, dial 0; to forward the message with a comment, dial 2; and to record a new message, dial 4."

When the user is at a telephone that is an analog display services interface (ADSI) device and the IVR system being accessed is ADSI compatible, the telephone can display the command menu of the IVR system so that the user can efficiently navigate through the command menu. When the user is at a telephone that is not an ADSI device, and/or when the IVR system being accessed is not ADSI compatible, the user is required to listen to each audibly generated command menu for deciding which number to enter for a particular command or function. This is inefficient and is inconvenient.

What is needed is a way for a user to efficiently navigate through a command menu of an IVR system when an ADSI telephone and/or an ADSI compatible IVR system is not available.

SUMMARY OF THE INVENTION

The present invention provides a method and a system that efficiently manipulates an IVR system remotely using a graphical interface when no ADSI control features are available. In this regard, the present invention provides a communication terminal having a display on which at least one command for controlling an interactive voice response system is displayed using a graphical user interface. The graphical user interface is based on locally stored information that relates to a command menu of the interactive voice response system. When a command is selected from the display, a command sequence, that includes at least one DTMF tone, is generated. Preferably, the command sequence also includes at least one DTMF tone that controls the interactive voice response system to return to a higher level within the command menu when the command menu is hierarchical.

BRIEF DESCRIPTION OF THE DRAWING

The present invention is illustrated by way of example and not limitation in the accompanying figures in which like reference numerals indicate similar elements and in which.

DETAILED DESCRIPTION

Figure 2:
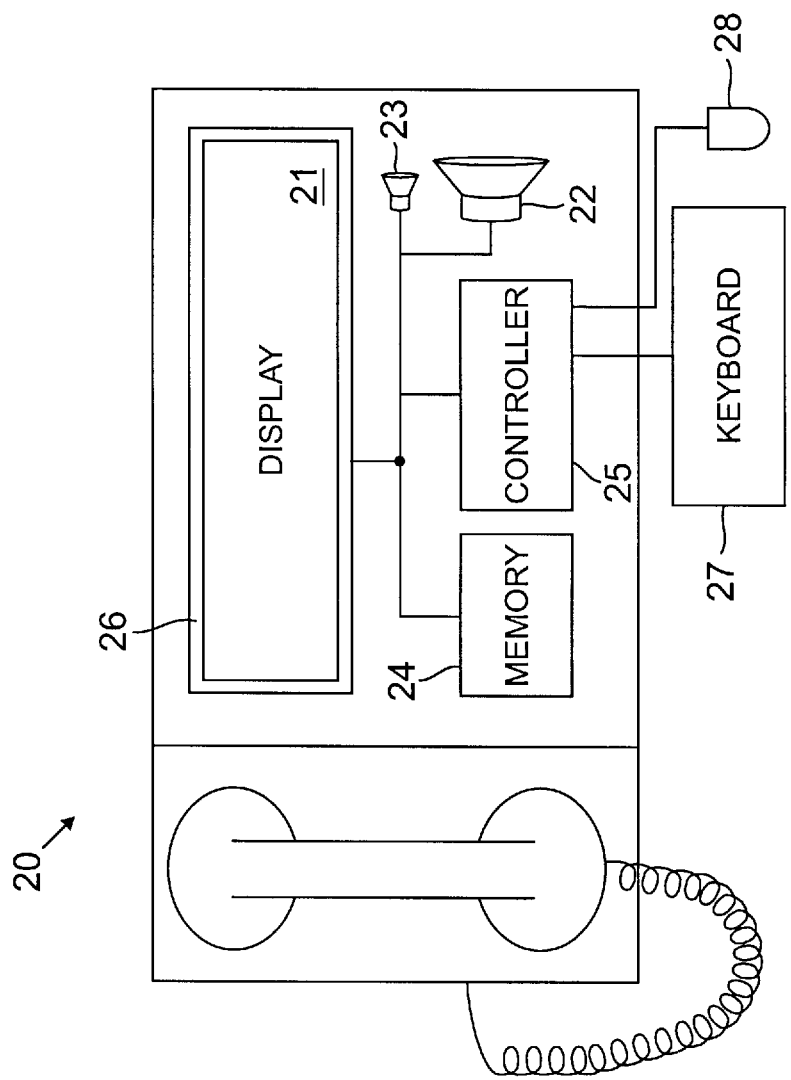
FIG. 2 shows a communication terminal having a display screen according to the invention.

FIG. 2 shows a customer premises equipment (CPE) communication terminal 20, such as a telephone, that is used for accessing a telecommunications service having an interactive voice response (IVR) system (not shown). Communication terminal 20 includes a display 21 that generates a graphical display that is used for remotely controlling the interactive voice response (IVR) system. The graphical display of terminal 20 permits a user to navigate the command and function menu of the IVR system without being required to listen to a menu list. The graphical display is generated, according to the present invention, when terminal 20 and/or the IVR system being accessed is not an analog display services interface (ADSI) device, that is, there is no ADSI control link between terminal 20 and the IVR system. Consequently, terminal 20 does not generate the graphical display based on ADSI data, regardless of availability of such data. In another mode, terminal 20 generates a graphical display that is used for creating batch commands for the IVR system when either terminal 20 or the IVR system being accessed is not ADSI compatible. Terminal 20 also includes a speaker 22 so that messages can be listened to, and a microphone 23 and a memory 24 so that greetings and messages can be recorded under the control of processor or controller 25 in a well-known manner.

Figure 1:
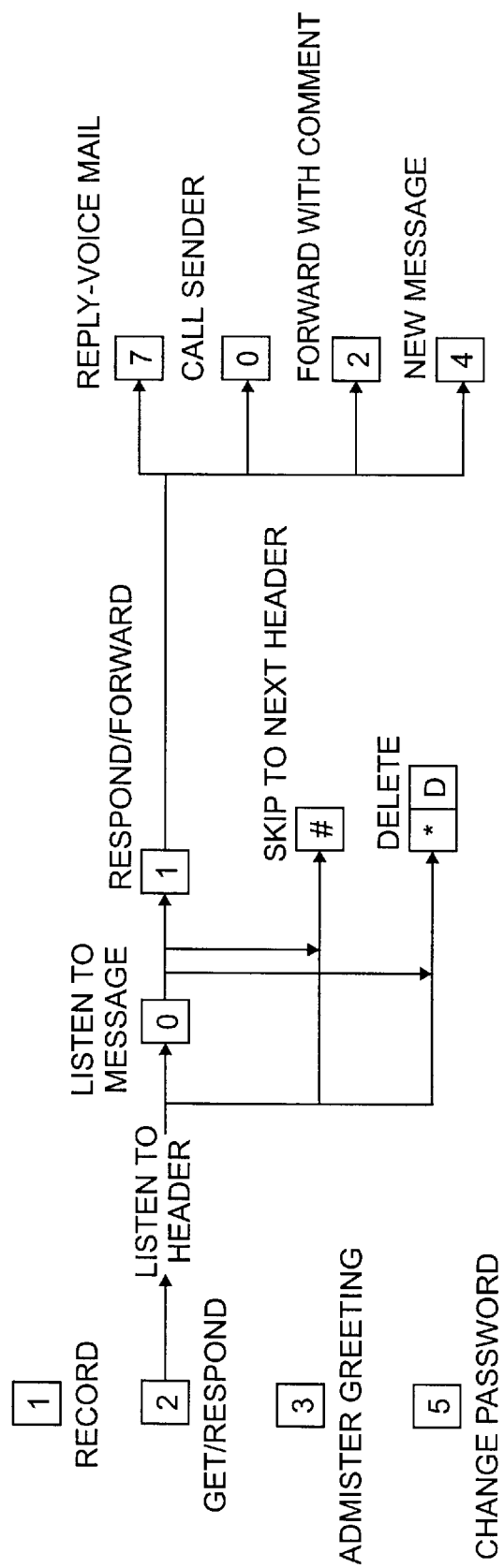
FIG. 1 shows a graphical representation of a portion of an interactive voice response system command menu.

Display 21, for the embodiment of terminal 20 shown in FIG. 1, can be a liquid crystal display (LCD) of sufficient size and pixel density for clearly displaying the graphical display in a bitmap format. Preferably, display 21 includes a well-known touchscreen input device 26. Other command selection input devices can be used, such as cursor and enter keys, or a mouse-type input device. When terminal 20 is a computer-based communication terminal, display 21 is a well-known CRT or a flatpanel display having sufficient size and resolution for clearly displaying the graphical user interface in a bitmap format. Display 21 for a computer-based communication terminal is preferably a well-known touchscreen input device. When configured as a computer-based communication terminal, terminal 20 can also respond to input from a keyboard 27, voice input (via microphone 23), and/or mouse-based (mouse 28) inputs.

Figure 3:
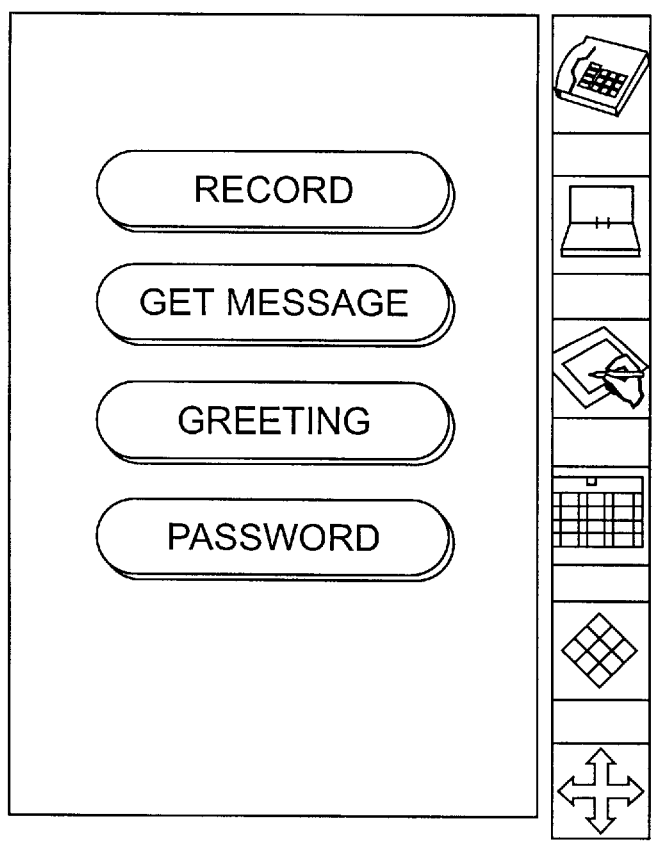
FIG. 3 is an exemplary graphical display for a first level of a portion of an exemplary command menu for an interactive voice response system according to the present invention.
Figure 4:
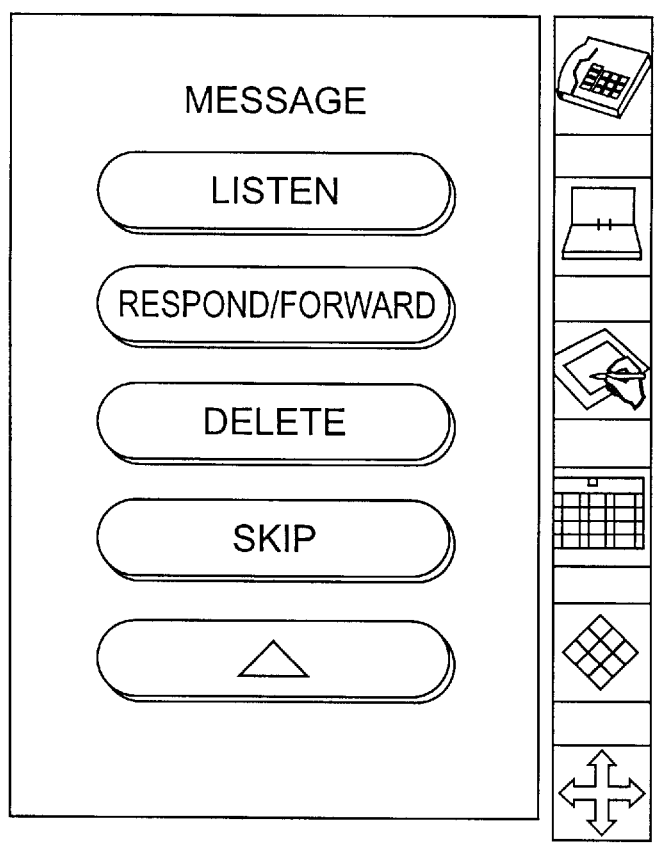
FIG. 4 is an exemplary graphical display for a second level of a portion of a exemplary command menu for an interactive voice response system according to the present invention.
Figure 5:
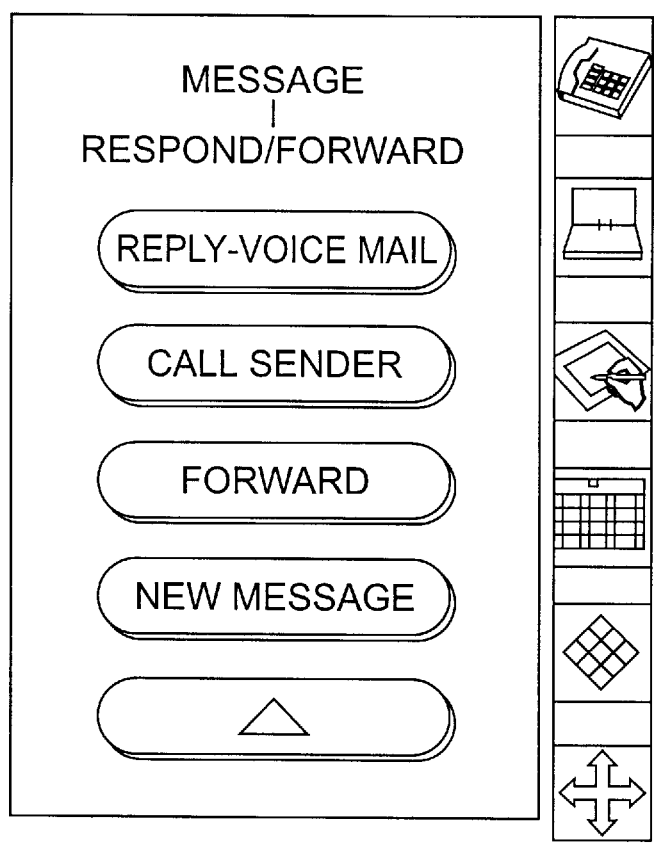
FIG. 5 is an exemplary graphical display for a third level of a portion of a exemplary command menu for an interactive voice response system according to the present invention.

FIGS. 3–5 show exemplary graphical displays for several levels of a portion of an exemplary hierarchical command menu for controlling an IVR system according to the present invention. The exemplary command menu displays of FIGS. 3–5 correspond to the menu structure described in FIG. 1. The graphical display of FIG. 3 shows a root, or entry level, menu list that includes a Record function, a Get Message function, a Greeting function and a Password function. A user can graphically select a particular function for advancing through the menu rather than being required to listen to an audibly generated list of the commands or functions. Non-hierarchical command menus are also applicable to the present invention.

When, for example, a user selects the Get Message function, the system advances through the menu so that the graphical display of FIG. 4 appears on display 21. At this level of the menu, the functions Listen, Respond/Forward, Delete, Skip and Return to Previous Menu, represented by a triangularly-shaped icon, are displayed. When the user selects the Respond/Forward function in a well-known manner, the system continues to advance through the menu, and the graphical display of FIG. 5 appears on display 21. At this level of the menu, the commands or functions shown on display 21 are Reply-Voice Mail, Call sender, Forward, New message and Return to Previous Screen.

For the present invention to be able to generate graphical displays of the command and function menus of a particular IVR system, the complete menu structure for the IVR system must be known in advance, and the IVR system must be able to be controlled from the root, or entry point, of its menu. Since terminal 20 and the IVR system are independent according to the invention, that is, there are no ADSI control links between the two devices, terminal 20 will not directly know the state of the IVR system, so terminal 20 reliably controls the IVR system from the root position of the menu for all commands and functions. For example, if the key sequence "*" always returns the IVR system to its entry point from anywhere within the command menu, then all command and functions can be reliably accessed by terminal 20 generating a DTMF tone sequence for "*" as a prefix for a command selection.

When terminal 20 detects that the IVR system is accessed, that is, when a call is completed to the IVR system, terminal 20 generates the root menu for display on display 21. At this point, terminal 20 can issue the DTMF tone sequence for "*" for ensuring that the IVR system is at the root menu. A user graphically selects a command or function from the graphically displayed root menu commands or functions on display 21. As each selection is made by a user navigating through the menu, terminal 20 generates the DTMF tone sequence for "*" as a prefix to the command sequence required to select a particular command or function from the root menu for each selected command for ensuring reliable selection of a command or function. The command sequence is transmitted to the IVR system at a rate that allows the IVR system to respond to each DTMF tone. Additionally, terminal 20 can temporarily disable the speaker when the command sequences are issued so that the DTMF tone sequence is not audible to the user.

As an alternative, terminal 20 can generate and issue an appropriate DTMF tone to the IVR system for a selected command or function as a user navigates through the menu away from the root menu when the menu is hierarchical. When a user desires to navigate back through the menu toward the root menu, terminal 20 must issue an appropriate number of "*" DTMF command tones for placing both terminal 20 and the IVR system at the correct point in the menu structure. This alternative of the present invention requires that both terminal 20 and the IVR system be reliably set to the same point in the menu. The preferred embodiment of the present invention ensures that both terminal 20 and the IVR system are reset to the root menu for each command before advancing through the menu to the selected command.

Figure 6:
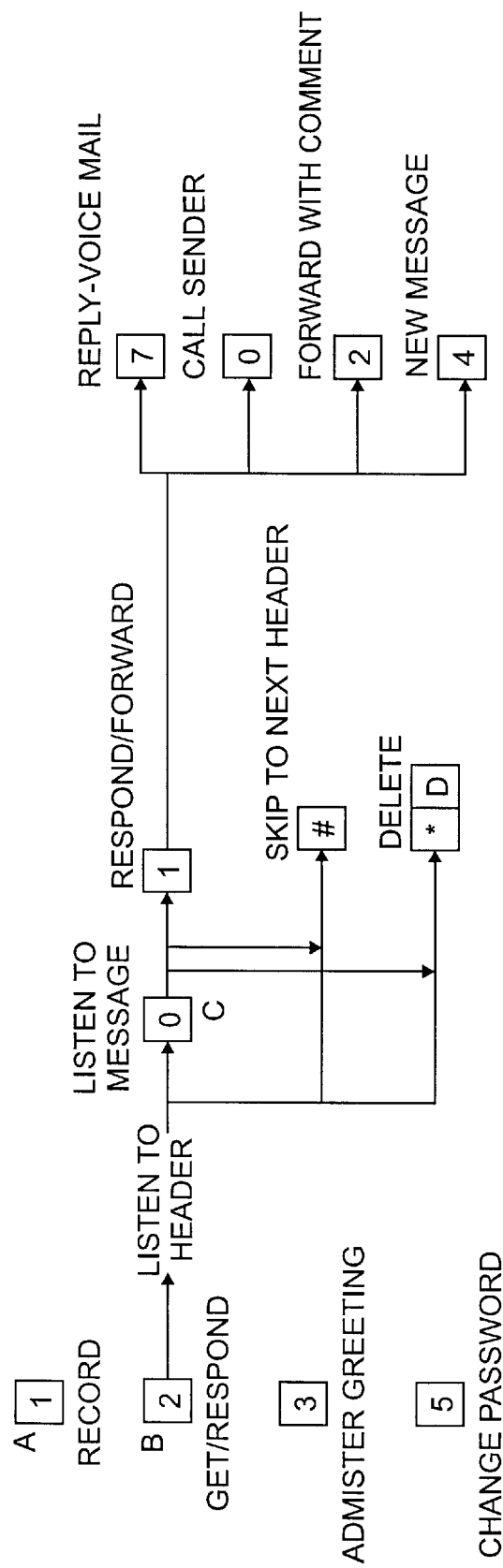
FIG. 6 is a graphical representation of the portion of the interactive voice response system command menu illustrated in FIGS. 3–5.

FIG. 6 is a graphical representation of the portion of the interactive voice response system command menu illustrated in FIGS. 3–5. In the preferred embodiment of the present invention, point A can reliably be reached by terminal 20 issuing the sequence "*1". Similarly, point B can always be reached by terminal 20 issuing the sequence "*2". Point C can always be reached by terminal 20 by issuing the sequence "***20".

The present invention also provides that a user can generate a sequence of DTMF tones for an IVR system prior to accessing the IVR system, and rapidly reconfigure the IVR system without requiring the user to interact with the IVR system by waiting for a system response to each individual command. For example, a user can conveniently change a password without directly interacting with the IVR system by accessing the graphical display for the IVR system and selecting the Password function. As the user navigates through the command menu, terminal 20 generates a sequence of DTMF tones for the commands or functions the user selects. When the user is done, the user exits the system by hanging up, for example, signalling the system that the command sequence is terminated. In response to the completion or termination of the batch command, terminal 20 automatically dials the IVR system and transmits the sequence of DTMF tones that were generated. When the desired command selected by a user is for recording a greeting or a message, the greeting or message is recorded in the memory of terminal 20. The DTMF command tone sequence generated by terminal 20 that is transmitted to the IVR system includes the recorded voice information at the appropriate spot. When a user desires to do several functions, the "*" DTMF tone sequence generated for each selected command when the batch command sequence is generated ensures that terminal 20** and the IVR system are always at the same point in the command menu.

While the present invention has been described in connection with the illustrated embodiments, it will be appreciated and understood that modifications may be made without departing from the true spirit and scope of the invention.

What is claimed is:

1. A method for controlling an interactive voice response system, comprising the steps of:

displaying at least one command for controlling an interactive voice response system;

receiving a selected command, the select command including voice-based information; and generating a command sequence related to the received voice-based information, the command sequence including at least one DTMF tone.

2. The method according to claim 1, wherein the step of displaying includes the steps of:

locally storing information relating to a command menu for the interactive voice response system; and generating a display of the at least one command based on the locally stored information.

3. The method according to claim 2, wherein the command menu for the interactive voice response system is non-hierarchical.

4. The method according to claim 2, wherein the command menu for the interactive voice response system is hierarchical.

5. The method according to claim 4, wherein the command sequence includes at least one DTMF tone for controlling the interactive voice response system to return to a higher hierarchical level within the command menu.

6. The method according to claim 1, further comprising the step of generating a call to a predetermined telephone number for the interactive voice response system prior to the step of displaying the at least one command; and wherein the step of displaying the at least one command is performed when a connection is established with the interactive voice response system.

7. The method according to claim 1, wherein the at least one command is displayed on a communication terminal display.

8. The method according to claim 1, further comprising the step of muting an audible output device before the step of generating the command sequence.

9. The method according to claim 1, further comprising the steps of:

receiving a command sequence termination signal;

generating a call to a predetermined telephone number for the interactive voice response system in response to the command sequence termination signal; and transmitting the command sequence when the call establishes a connection to the interactive voice response system.

10. The method according to claim 9, wherein the at least one command is displayed on a communication terminal display.

11. The method according to claim 10, wherein selected graphical information is displayed on the communication terminal display.

12. The method according to claim 11, wherein the step of receiving a selected command includes the step of selecting the command using an input device.

13. An interactive voice response system remote control system, comprising:

a memory for storing information relating to a command menu of an interactive voice response system;

a display for displaying at least one command of an interactive voice response system based on the information stored in the memory;

an input device for selecting a command displayed on the display, the input device receiving voice-based information related to a selected command; and a controller coupled to the memory and the display and being responsive to the voice-based information received by the input device by generating a command sequence related to the received voice-based information, the command sequence including at least one DTMF tone.

14. The system according to claim 13, wherein the command menu of the interactive voice response system is non-hierarchical.

15. The system according to claim 13, wherein the command menu of the interactive voice response system is hierarchical.

16. The system according to claim 15, wherein the command sequence includes at least one DTMF tone for controlling the interactive voice response system to return to a higher hierarchical level within the command menu.

17. The system according to claim 13, wherein the controller generates a call to a predetermined telephone number for the interactive voice response system in response to a predetermined command received from the input device.

18. The system according to claim 13, wherein selected graphical information is displayed on the display.

19. The system according to claim 18, wherein the input device includes a touchscreen on the display.

20. The system according to claim 18, wherein the input device includes a keyboard.

21. The system according to claim 18, wherein the input device is a microphone.

22. The system according to claim 18, wherein the input device includes a mouse.

23. The system according to claim 18, wherein the controller is responsive to a command sequence termination signal received by the input device by generating a call to a predetermined telephone number for the interactive voice response system and transmitting the command sequence to the interactive voice response system when a connection is established with the interactive voice response system.

* * * * *